(12) United States Patent
Li et al.

(10) Patent No.: US 8,216,521 B2
(45) Date of Patent: Jul. 10, 2012

(54) METHOD AND APPARATUS FOR AMMONIA FORMATION IN A CATALYTIC CONVERTER

(75) Inventors: Wei Li, Troy, MI (US); Paul M. Najt, Bloomfield Hills, MI (US); Kushal Narayanaswamy, Sterling Heights, MI (US); Kevin L. Perry, Fraser, MI (US); Chang H. Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/624,709

(22) Filed: Nov. 24, 2009

(65) Prior Publication Data
US 2010/0293930 A1    Nov. 25, 2010

Related U.S. Application Data

(60) Provisional application No. 61/120,370, filed on Dec. 5, 2008.

(51) Int. Cl.
*B01D 50/00* (2006.01)
(52) U.S. Cl. ..................... 422/177; 422/180
(58) Field of Classification Search ............... 422/177, 422/180, 222; 60/274, 299, 303; 502/304, 502/326
See application file for complete search history.

(56) References Cited

U.S. PATENT DOCUMENTS

| | | | |
|---|---|---|---|
| 5,089,237 A * | 2/1992 | Schuster et al. | 422/180 |
| 6,753,294 B1 * | 6/2004 | Brisley et al. | 502/439 |
| 7,097,817 B2 * | 8/2006 | Brisley et al. | 423/245.3 |
| 7,426,825 B2 * | 9/2008 | Viola et al. | 60/286 |
| 7,476,417 B2 * | 1/2009 | Dettling et al. | 427/238 |
| 2004/0076565 A1 * | 4/2004 | Gandhi et al. | 423/235 |
| 2004/0254073 A1 * | 12/2004 | Wei et al. | 502/527.12 |
| 2005/0129601 A1 | 6/2005 | Li et al. | |
| 2008/0089820 A1 | 4/2008 | Jacob | |
| 2008/0102010 A1 | 5/2008 | Bruck et al. | |
| 2010/0236224 A1 * | 9/2010 | Kumar et al. | 60/297 |
| 2011/0173950 A1 * | 7/2011 | Wan et al. | 60/274 |

FOREIGN PATENT DOCUMENTS

| | | |
|---|---|---|
| DE | 69133034 T2 | 10/2002 |
| EP | 1674682 A1 | 6/2006 |

OTHER PUBLICATIONS

Nakahira, T.,"Catalytic Engine" NOx Reduction of Diesel Engines with New Concept Onboard Ammonia Synthesis System; SAE Technical Paper Series; Feb. 1992; SAE 920469.

(Continued)

*Primary Examiner* — Tom Duong

(57) ABSTRACT

An exhaust gas aftertreatment system for treating an engine-out exhaust gas feedstream of a spark-ignition direct-injection engine includes a multi-stage catalytic converter comprising a converter inlet, a converter outlet, and a substrate having a first end associated with the converter inlet and a second end associated with the converter outlet. The substrate further includes a multiplicity of flow passages between the first and second ends of the substrate, a first surface location corresponding to the first end of the substrate, and a second surface location corresponding to the second end of the substrate. The first and second washcoat stages include washcoats formulated to generate hydrogen and ammonia from the engine-out exhaust gas feedstream. An ammonia-selective catalytic reduction device is downstream of the first and second washcoat stages.

26 Claims, 3 Drawing Sheets

OTHER PUBLICATIONS

Ogunwumi, S.; In-Situ NH3 Generation for SCR NOx Applications; SAE Technical Paper Series; Oct. 2002; SAE 2002-01-2872.
U.S. Appl. No. 12/360,908, Najt, et al.
U.S. Appl. No. 12/390,588, Narayanaswamy, et al.
U.S. Appl. No. 12/329,162, Perry, et al.
U.S. Appl. No. 12/330,587, Najt, et al.
U.S. Appl. No. 12/576,412, Perry, et al.
U.S. Appl. No. 12/360,901, Perry, et al.

* cited by examiner

METHOD AND APPARATUS FOR AMMONIA FORMATION IN A CATALYTIC CONVERTER

CROSS REFERENCE TO RELATED APPLICATIONS

This application claims the benefit of U.S. Provisional Application No. 61/120,370, filed on Dec. 5, 2008, which is incorporated herein by reference.

TECHNICAL FIELD

This disclosure relates to exhaust aftertreatment systems.

BACKGROUND

The statements in this section merely provide background information related to the present disclosure and may not constitute prior art.

Known spark-ignition (SI) engines introduce an air/fuel mixture into each cylinder, which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

An engine configured for spark ignition combustion can be adapted to operate in a stratified charge combustion mode under predetermined speed/load operating conditions. It is known that operating lean of stoichiometry using a stratified combustion charge can improve fuel economy but can increase exhaust emissions, including nitrogen oxides (NOx). It is known to use an ammonia-selective catalytic reduction device to reduce NOx in the presence of a reductant, e.g., urea. It is known that refilling a urea tank can burden an operator.

Known aftertreatment systems for internal combustion engines operating lean of stoichiometry can include a three-way catalytic converter followed by other exhaust aftertreatment devices, including a lean-NOx reduction catalyst, also referred to as a lean NOx adsorber and a selective catalytic reduction (SCR) catalytic device. Known three-way catalytic converters function to oxidize engine-out hydrocarbon (HC), carbon monoxide (CO), and reduce nitrides of oxygen (NOx) emissions during stoichiometric engine operation and oxidize HC and CO emissions during lean engine operation.

Known SCR devices include catalyst material(s) that promotes the reaction of NOx with a reductant, such as ammonia (NH3) or urea, to produce nitrogen and water. Reductant materials may be injected into an exhaust gas feedstream upstream of the SCR device, requiring injection systems, tanks and control schemes.

Known catalyst materials used in SCR devices include vanadium (V) and tungsten (W) on titanium oxides (TiO2). Mobile applications include base metals including iron (Fe) or copper (Cu) with a zeolite washcoat as catalyst materials. Material concerns for catalyst materials include temperature operating ranges, thermal durability, and reductant storage efficiency. For mobile applications, SCR devices have an operating temperature range between 150° C. and 600° C., which may vary depending on the selected catalyst material(s) and operating conditions.

SUMMARY

An exhaust gas aftertreatment system for treating an engine-out exhaust gas feedstream of a spark-ignition direct-injection engine includes a multi-stage catalytic converter comprising a converter inlet, a converter outlet, and a substrate having a first end associated with the converter inlet and a second end associated with the converter outlet. The substrate further includes a multiplicity of flow passages between the first and second ends of the substrate, a first surface location corresponding to the first end of the substrate, and a second surface location corresponding to the second end of the substrate. A first washcoat stage is applied to the substrate at the first surface location corresponding to the first end of the substrate. A second washcoat stage is applied to the substrate at the second surface location corresponding to the second end of the substrate. The first and second washcoat stages include washcoats formulated to generate hydrogen and ammonia from the engine-out exhaust gas feedstream. An ammonia-selective catalytic reduction device is downstream of the first and second washcoat stages.

BRIEF DESCRIPTION OF THE DRAWINGS

One or more embodiments will now be described, by way of example, with reference to the accompanying drawings, in which.

DETAILED DESCRIPTION

Figure 1:
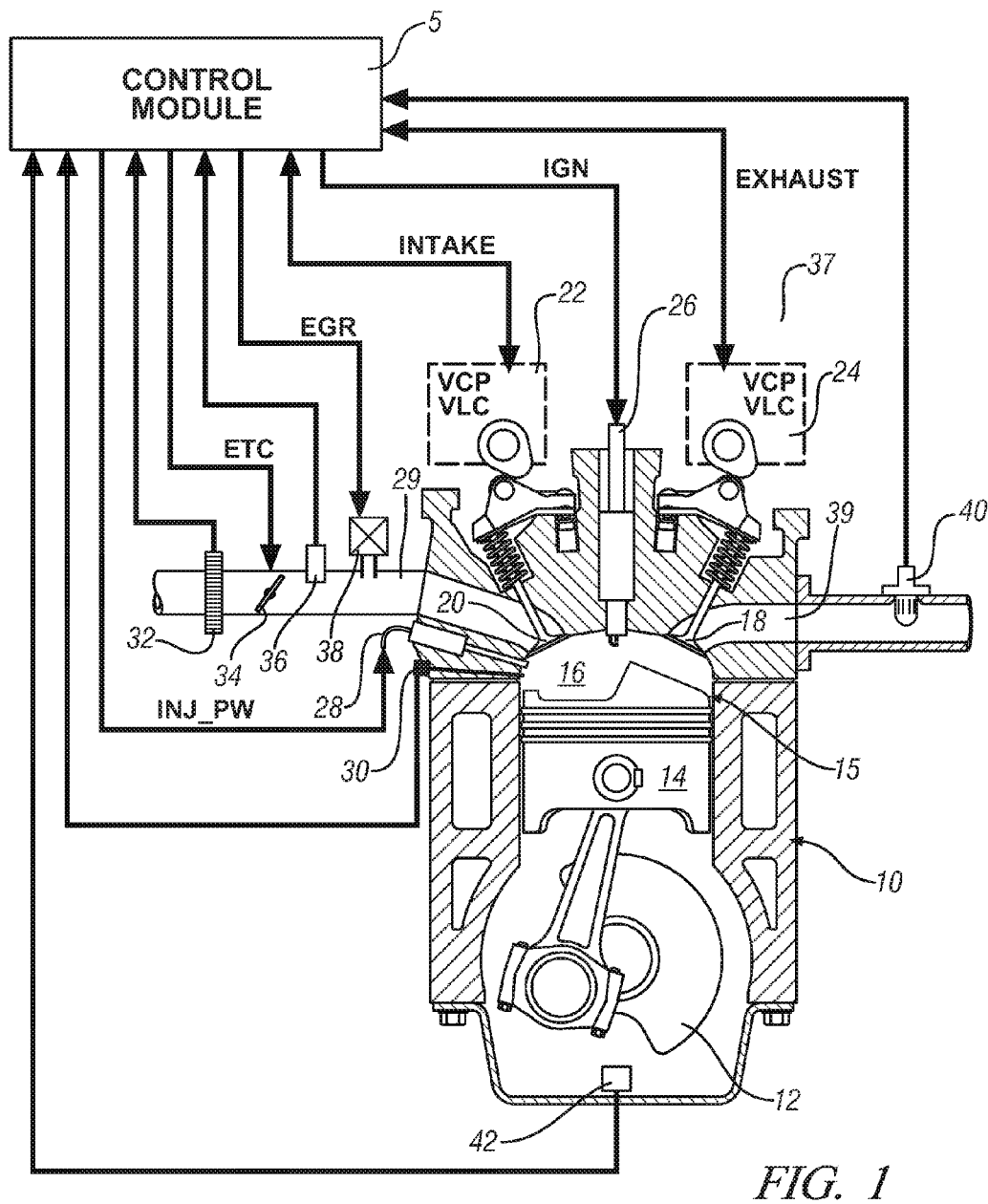
FIG. 1 is a schematic drawing of an internal combustion engine and an accompanying control module in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and an intermediate stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles. Like numerals refer to like elements in the figures.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, in one embodiment including an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 may take any suitable form including various combinations of Application Specific Integrated Circuit(s) (ASIC), electronic circuit(s), a central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via a throttle pedal and a brake pedal) to determine an operator torque request the control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust rebreathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

Figure 2:
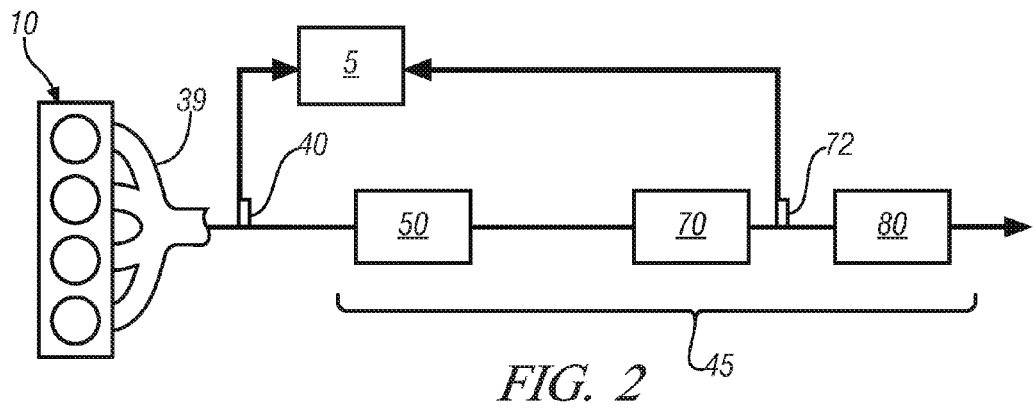
FIG. 2 schematically shows details of an embodiment of a first aftertreatment device including a multi-stage catalytic converter in accordance with the present disclosure.

FIG. 2 schematically illustrates an embodiment of an exhaust aftertreatment system 45 fluidly coupled to the engine 10 to manage and treat the exhaust gas feedstream. The exhaust manifold 39 entrains exhaust gas flow from the engine cylinders and directs flow to the exhaust aftertreatment system 45. The exhaust aftertreatment system 45 includes a plurality of aftertreatment devices fluidly connected in series, including a multi-stage catalytic converter 50 and second and third aftertreatment devices 70 and 80 in one embodiment. An exhaust gas feedstream monitoring sensor 72 is preferably placed downstream of the second aftertreatment device 70 to monitor NOx emissions. The aftertreatment devices 50, 70 and 80 can be assembled into individual structures that are fluidly connected and assembled in an engine compartment and a vehicle underbody with one or more sensing devices placed therebetween. The second and third aftertreatment devices 70 and 80 can be assembled into a structure located in the underbody of the vehicle. One skilled in the art can conceive of other assembly configurations.

The multi-stage catalytic converter 50 is preferably close-coupled to the exhaust manifold 39. Embodiments are described with reference to FIGS. 3 and 4. In one embodiment, the second aftertreatment device 70 includes an ammonia-selective catalytic reduction (SCR) catalytic device, preferably including a cordierite substrate having a zeolite-based washcoat containing one or more metals/metal oxides, e.g., Fe, Cu, and/or $V_2O_5$. The zeolite can be either ZSM-5, Beta, Chabazite, or Y zeolite (or USY ultra-stable Y). The Fe or Cu loading is preferably 1-10% and more preferably 2-5% by weight in the washcoat. Other components (Ce, Zr, Co, Pt, etc.) may also be added as promoters. The ammonia-selective catalytic reduction (SCR) catalytic device 70 stores ammonia to reduce NOx emissions in the exhaust gas feedstream during lean engine operation. The stored ammonia ($NH_3$) selectively reacts with NOx in the presence of the catalytic materials to produce nitrogen and water. The following equations describe the primary reactions with ammonia within the ammonia-selective catalytic reduction (SCR) catalytic device 70:

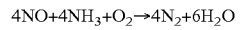
$$4NO+4NH_3+O_2 \rightarrow 4N_2+6H_2O \qquad [1]$$

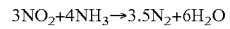
$$3NO_2+4NH_3 \rightarrow 3.5N_2+6H_2O \qquad [2]$$

$$2NO+2NO_2+4NH_3 \rightarrow 4N_2+6H_2O \qquad [3]$$

Multiple secondary reactions may concurrently occur and will vary depending on specifics of the engine fuel.

The third aftertreatment device 80 preferably includes an ammonia slip catalytic device, including a cordierite substrate having an alumina-based washcoat containing one or more platinum-group metals, e.g., Pt, Pd, Rh, configured to oxidize residual ammonia and other exhaust gas feedstream constituents.

Design features for each of the multi-stage catalytic converter 50 and the second and third aftertreatment devices 70 and 80, e.g., volume, space velocity, cell densities, washcoat densities, and metal loadings can be determined for specific applications by a person having skill in the art.

The multi-stage catalytic converter 50 is configured to produce ammonia during engine operation. Ammonia may be produced in the multi-stage catalytic converter 50 from a conversion process described by the following equation:

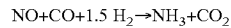
$$NO+CO+1.5\ H_2 \rightarrow NH_3+CO_2 \qquad [4]$$

One having ordinary skill in the art will appreciate that this conversion requires molecular oxygen to be depleted from the multi-stage catalytic converter 50 before NO will react with molecular hydrogen. In one embodiment, sufficient conversion has been shown to occur at temperatures exceeding 250° C. in the multi-stage catalytic converter 50. Excess oxygen is frequently present when the internal combustion engine 10 operates in a lean operating mode, with a lean air/fuel ratio or with excess air added in the exhaust gas feedstream. Thus, the control module 5 controls engine-out air/fuel ratio at stoichiometry or slightly rich to deplete oxygen in the exhaust gas feedstream to produce ammonia. Furthermore, operating the engine 10 at stoichiometry or slightly rich facilitates ammonia production by producing nitric oxide (NO) and hydrogen ($H_2$) in appropriate ratios that convert to ammonia across the multi-stage catalytic converter 50. Eq. 4 describes an ideal ratio of 1.5:1 of hydrogen to nitric oxide ($H_2$:NO). Different actual ratios of hydrogen ($H_2$) to nitric oxide (NO) are associated with engine operation at varying air/fuel ratios that produce ammonia include a range between 3:1 and 5:1 of hydrogen to nitric oxide ($H_2$:NO) and a range between 9:1 and 15:1 of carbon monoxide to nitric oxide (CO:NO), depending upon the environment provided by the ammonia-selective catalytic reduction (SCR) catalytic device and other reactions taking place within the multi-stage catalytic converter 50. In operation, ammonia produced in the multi-stage catalytic converter 50 is stored on the second aftertreatment device 70 including the ammonia-selective catalytic reduction (SCR) catalytic device, and used to reduce NOx to nitrogen and oxygen during subsequent engine operation at a lean air/fuel ratio using passive ammonia-selective catalytic reduction.

Figure 3:
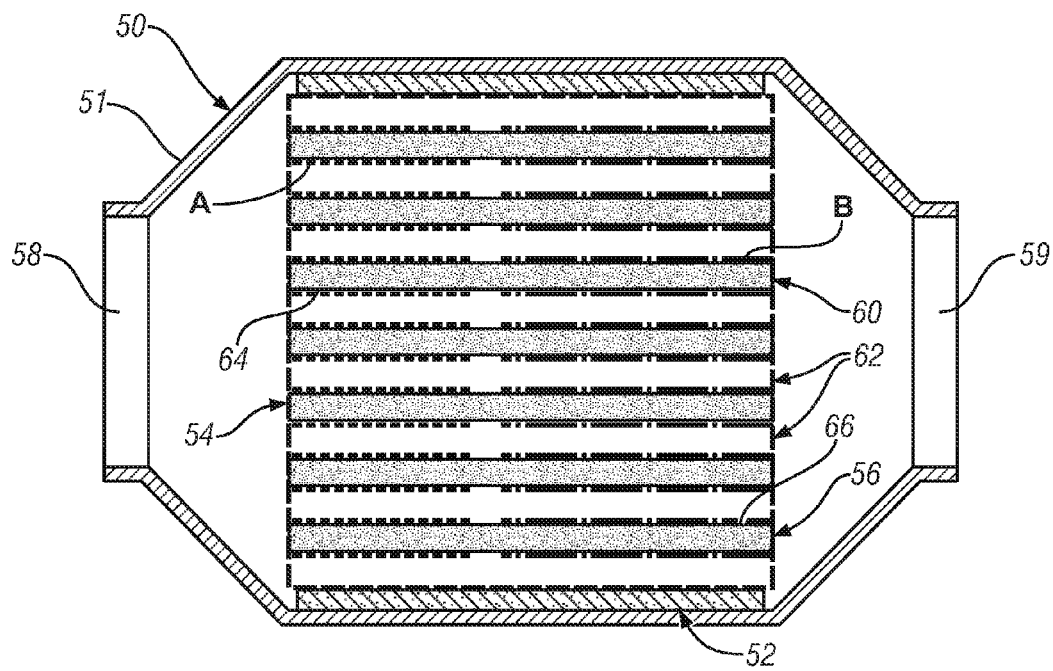
FIG. 3 is a schematic diagram of an embodiment of a multi-stage catalytic converter including a flow-through substrate in accordance with the present disclosure.

FIG. 3 schematically shows details of an embodiment of the first aftertreatment device including the multi-stage catalytic converter 50. The multi-stage catalytic converter 50 includes a metallic container 51 that provides a structural housing for a coated substrate 60 and includes a converter inlet 58 and a converter outlet 59 that define a flow path for the exhaust gas feedstream. The converter inlet 58 fluidly connects to the exhaust manifold 39, preferably in a close-coupled arrangement. The converter outlet 59 fluidly connects to the second aftertreatment device 70, preferably via an exhaust pipe. Insulative support material 52 wraps around the substrate 60 and mechanically secures the substrate 60 within the metallic container 51. The insulative support material 52 also provides a sealing function to ensure that the exhaust gas feedstream flows through the substrate 60 when passing from the converter inlet 58 to the converter outlet 59. The substrate 60 includes a first end 54 associated with the converter inlet 58 and a second end 56 associated with the converter outlet 59.

The substrate 60 preferably has a honeycomb structure formed from extruded cordierite with a multiplicity of flow passages 62 formed parallel to an axis between the converter inlet 58 and the converter outlet 59. Walls of the substrate 60 formed between the flow passages 62 by the extruded cordierite are porous. Each of the flow passages 62 is opened at both first and second ends 54, 56 in this embodiment. The exhaust gas feedstream flows through the flow passages 62 of the substrate 60 as exhaust gas flows from the converter inlet 58 to the converter outlet 59 due to pressure differentials during engine operation. Flow of the exhaust gas feedstream through the substrate 60 brings the exhaust gas feedstream in close proximity to washcoat materials on surfaces of the substrate 60.

The multi-stage catalytic converter 50 of this embodiment includes the substrate 60 having a first washcoat stage that is fluidly upstream of a second washcoat stage. The substrate 60 is coated with a plurality of washcoat materials that are applied at specific substrate surface locations defined by the converter inlet 58, the converter outlet 59, the first end 54, the second end 56, and the exhaust gas feedstream flow path.

Elements A and B depict specific substrate surface locations that are associated with the first washcoat stage and the second washcoat stage, respectively. The washcoat location A includes a portion of the substrate 60 on the first end 54 of the substrate 60 and includes approximately one-half of the length of the substrate 60. The washcoat location B includes a portion of the substrate 60 on the second end 56 of the substrate 60 and includes approximately one-half of the length of the substrate 60. In this embodiment, the substrate 60 includes the first washcoat stage applied at the washcoat location A and the second washcoat stage applied at the washcoat location B.

Hydrogen usable for producing ammonia is present in some concentration level in the engine-out exhaust gas feedstream. Hydrogen can also be generated across a washcoat as part of a water-gas shift reaction.

When an engine-out exhaust gas feedstream does not have a sufficient concentration of hydrogen to generate ammonia, the washcoat malt for the first and second stages are preferably formulated to generate hydrogen upstream of and prior to generating ammonia. In such engine configurations, the washcoat for the first washcoat stage is formulated to promote water-gas shift reactions to form hydrogen molecules and initiate formation of ammonia when the exhaust gas feedstream is at stoichiometry or slightly rich. In one embodiment, preferred washcoat materials for the first washcoat stage include an alumina-based washcoat including platinum-group metals including platinum and rhodium, and high levels of cerium for oxygen storage capacity. Alternatively, preferred washcoat materials for the first washcoat stage include an alumina-based washcoat including platinum-group metals including only rhodium with high levels of cerium for oxygen storage capacity. The corresponding washcoat for the second washcoat stage is formulated to promote ammonia formation and minimize and suppress ammonia oxidation. Preferred washcoat materials for the second washcoat stage include an alumina-based washcoat including platinum with little or no cerium and thus no oxygen storage capacity. Alternatively, washcoat materials for the second washcoat stage include an alumina-based washcoat including palladium with little or no cerium and thus no oxygen storage capacity.

When an engine-out exhaust gas feedstream has sufficient concentration of hydrogen to generate ammonia, the washcoat formulations for the first and second stages are preferably formulated to generate ammonia without prior generation of hydrogen. In such engine configurations, the washcoat for the first washcoat stage is formulated to promote formation of ammonia when the exhaust gas feedstream is at stoichiometry or slightly rich and oxidize HC and CO during lean engine operation. In one embodiment, preferred washcoat materials for the first washcoat stage include an alumina-based washcoat including platinum-group metals including palladium with low levels or no cerium, and thus low or no oxygen storage capacity, e.g., palladium on alumina (Pd/$Al_2O_3$). The corresponding washcoat for the second washcoat stage is formulated to promote a water-gas shift reaction to reduce CO breakthrough during rich operation, use the hydrogen produced during the water-gas shift reaction and any NOx breakthrough from the first washcoat stage to maximize ammonia formation, promote oxidation of CO and HC during lean operation, and provide a three-way catalytic function during stoichiometric operation. Preferred washcoat materials for the second washcoat stage include an alumina-based washcoat including palladium, rhodium, and cerium for oxygen storage capacity.

Figure 4:
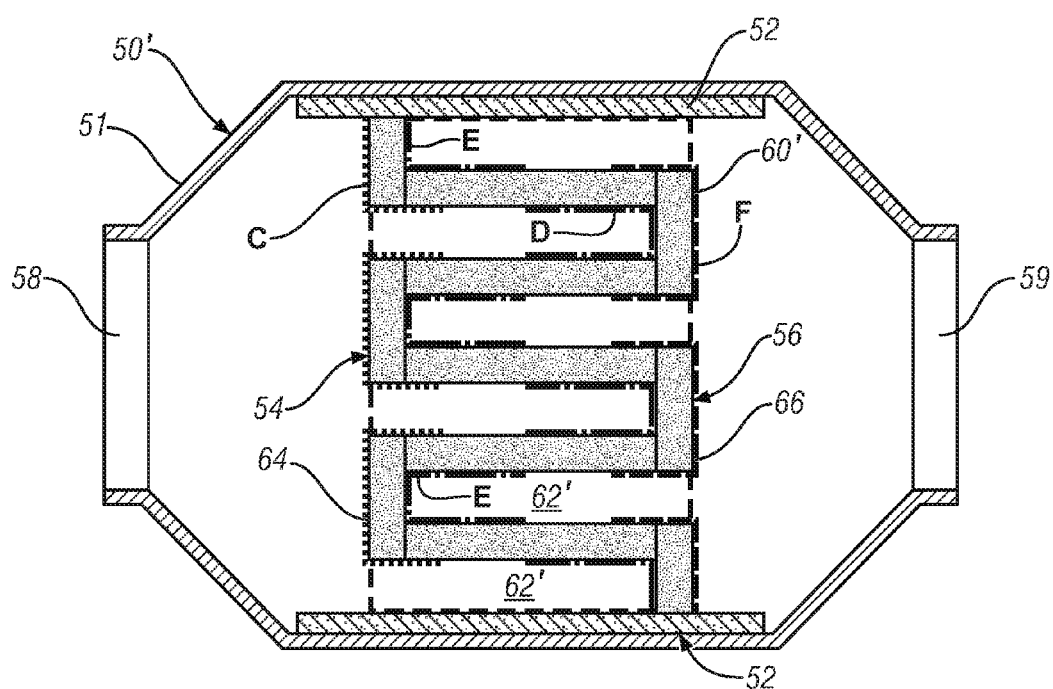
FIG. 4 is a schematic diagram of an embodiment of a multi-stage catalytic converter including a substrate having a wall-flow filter device in accordance with the present disclosure.

FIG. 4 schematically shows details of a second embodiment of the multi-stage catalytic converter 50', which includes a substrate 60' configured as a wall-flow filter device for removing particulate matter from the exhaust gas feedstream. The substrate 60' includes the first end 54 associated with the converter inlet 58 and the second end 56 associated with the converter outlet 59.

The coated substrate 60' is formed from extruded silicon carbide (SiC) including a multiplicity of flow passages 62' that are alternatingly plugged on the first end 54 and the second end 56, preferably in a checkerboard fashion. Alternatively, the coated substrate is formed from one of cordierite, aluminum titanate, and Fe—Cr alloy foams. The alternatingly plugged flow passages 62' cause the exhaust gas feedstream to flow through the porous walls of the substrate 60' as exhaust gas flows from the converter inlet 58 to the converter outlet 59 due to pressure differentials during engine operation. Flow of the exhaust gas feedstream through the porous walls of the substrate 60' serves to filter or strip particulate matter out of the exhaust gas feedstream and bring the exhaust gas feedstream in close proximity to the washcoat.

The substrate 60' is further described in terms of a flow inlet side 64 and a flow outlet side 66. The flow inlet side 64 corresponds and is exposed to the exhaust gas feedstream prior to flowing through the porous walls of substrate 60'. The flow outlet side 66 corresponds and is exposed to the exhaust gas feedstream after flowing through the porous walls of substrate 60'. The flow inlet side 64 is understood to be upstream of the flow outlet side 66.

The multi-stage catalytic converter 50' of this embodiment includes the substrate 60' having the first washcoat stage applied fluidly upstream of the second washcoat stage. In one embodiment, the substrate 60' has a third washcoat stage that is applied fluidly downstream of the first and second washcoat stages. The substrate 60' is coated with a plurality of washcoat materials applied at specific substrate surface locations defined by the converter inlet 58, the converter outlet 59, the first end 54, the second end 56, the flow inlet side 64 and the flow outlet side 66, and the exhaust gas feedstream flowpath.

Elements C, D, E, and F depict specific substrate surface locations that are associated with the first washcoat stage and the second washcoat stage, and the third washcoat stage where applied. The substrate surface location C includes a portion of the substrate 60' on the first end 54 of the flow inlet side 64 and includes approximately one-half of the length of the substrate 60'. The substrate surface location D includes a portion of the substrate 60' on the second end 56 of the flow inlet side 64 and includes approximately one-half of the length of the substrate 60'. The substrate surface location E includes a portion of the substrate 60' on the first end 54 of the flow outlet side 66 and includes approximately one-half of the length of the substrate 60'. The substrate surface location F includes a portion of the substrate 60' on the second end 56 of the flow outlet side 66 and includes approximately one-half of the length of the substrate 60'.

In one embodiment, the first washcoat stage is applied on the substrate 60' at the substrate surface locations C and D, and the second washcoat stage applied at substrate surface locations E and F. Alternatively, the first washcoat stage applied on the substrate 60' at the substrate surface locations C and E, and the second washcoat stage applied on the substrate 60' at substrate surface locations D and F. The washcoats for the first and second washcoat stages were previously described with reference to FIG. 3.

In one embodiment, the substrate 60' includes the first washcoat stage applied at the substrate surface location C, and the second washcoat stage applied at substrate surface location D, and a third washcoat stage applied at substrate surface locations E and F. The third washcoat stage includes an ammonia-selective catalytic reduction (SCR) washcoat, e.g., a zeolite-based washcoat containing one or more metals/metal oxides, e.g., Fe, Cu, and/or $V_2O_5$. The zeolite can be either ZSM-5, Beta, Chabazite, or Y zeolite (or USY ultrastable Y) as described hereinabove. One having ordinary skill in the art can appreciate that the hydrogen and ammonia generated at the first and second washcoats comes into contact with the third washcoat stage after flowing through the porous walls of the substrate 60'. In this embodiment, the third washcoat stage including the ammonia-selective catalytic reduction (SCR) washcoat is effective as an ammonia-selective catalytic reduction (SCR) catalytic device and the second aftertreatment device 70 can be omitted from the exhaust aftertreatment system 45.

The exhaust gas feedstream contains NOx which passes through the multi-stage catalytic converter 50' and is reduced to $N_2$ in the aftertreatment device 70 in the presence of the stored ammonia reductant. The engine 10 can operate lean until the ammonia reductant is substantially depleted or another opportunity to create ammonia reductant is presented, such as during an engine cold start operation, a high load operation, and an acceleration event. When the stored ammonia reductant is substantially depleted, the engine 10 can be controlled to operate at or near stoichiometry in order to minimize NOx generation. The multi-stage catalytic converter 50' operates using the three-way catalytic function and oxygen storage/release function to oxidize HC and CO and reduce NOx in the presence of stored oxygen. For purposes of this description, the ammonia reductant is substantially depleted when there is insufficient ammonia reductant stored in the aftertreatment device 70 to reduce NOx in the exhaust gas feedstream to meet a predetermined NOx concentration, measured by way of example in mass of NOx over distance traveled, e.g., mg(NOx)/km.

Figure 5:
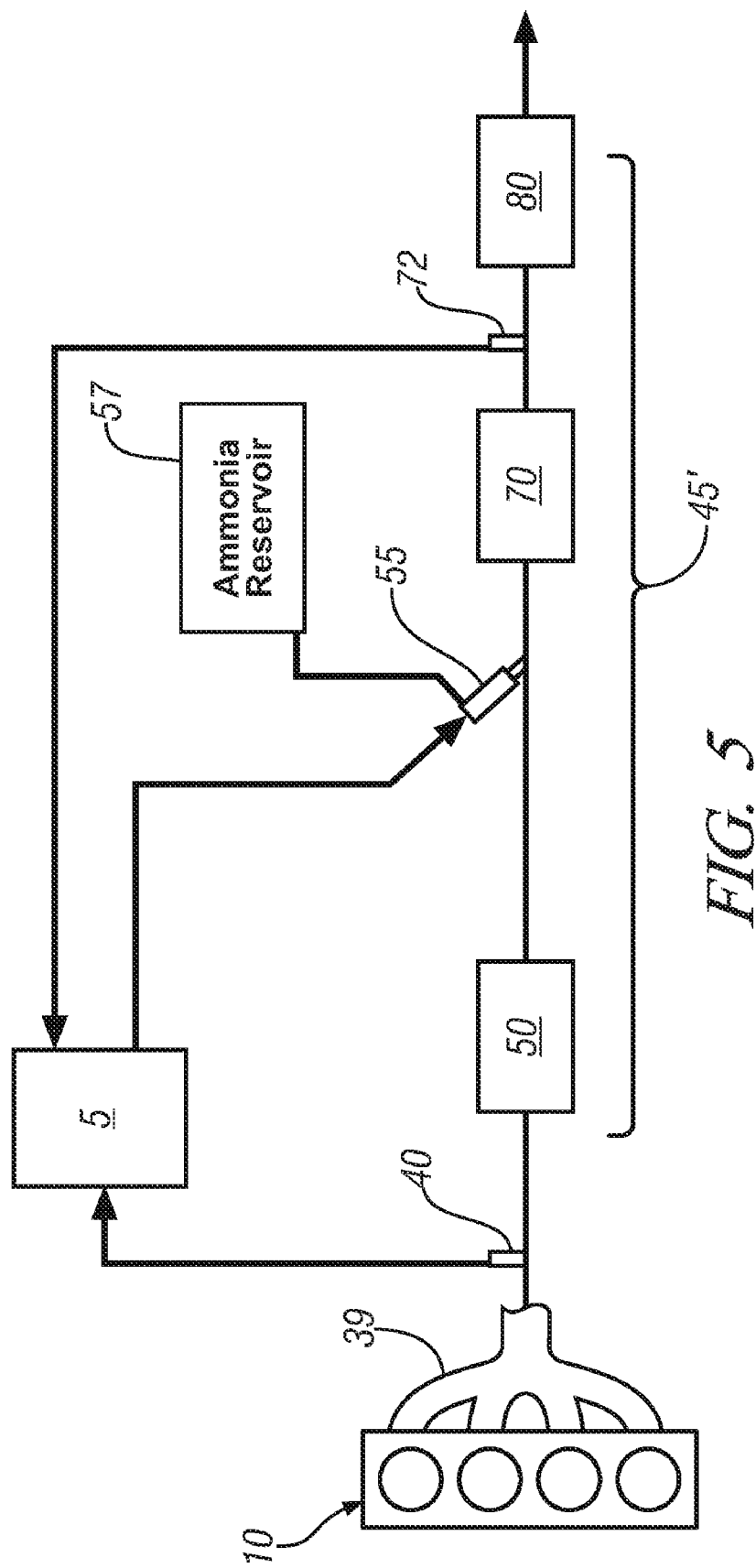
FIG. 5 schematically illustrates an embodiment of the exhaust aftertreatment system including a reductant injection device fluidly coupled to an ammonia reservoir tank to inject urea into the exhaust gas feedstream in accordance with the present disclosure.

FIG. 5 schematically illustrates another embodiment of the exhaust aftertreatment system 45' including a reductant injection device 55 fluidly coupled to an ammonia reservoir tank 57 to inject urea into the exhaust gas feedstream. The reductant injection device 55 injects urea into the exhaust gas feedstream in a process referred to as active ammonia-selective catalytic reduction. NOx emissions are reduced to nitrogen in the second aftertreatment device 70 including the ammonia-selective catalytic reduction (SCR) catalytic device, in the presence of ammonia in the urea. The active ammonia-selective catalytic reduction can be used during high load engine operation and at low load engine operation when the ammonia stored on the aftertreatment device 70 is substantially depleted, and at other periods during engine operation.

In one embodiment, the active ammonia-selective catalytic reduction is used in combination with the passive ammonia-selective catalytic reduction to reduce NOx emissions. During engine operation, e.g., under low load and steady state conditions, the engine 10 is operated at a lean air/fuel ratio, preferably in a range that is greater than 20:1. The exhaust gas feedstream contains NOx which passes through the multi-stage catalytic converter 50 and is reduced to N2 in the aftertreatment device 70 in the presence of the stored ammonia. Under specific operating conditions, e.g., high engine load operation or acceleration, the active ammonia-selective catalytic reduction can be used in combination with passive ammonia-selective catalytic reduction to reduce NOx emissions. The engine 10 can operate under such conditions until the ammonia is substantially depleted or another opportunity to create ammonia is presented, such as during a high load operation or during an acceleration event.

The control module 5 preferentially controls engine operation using the passive ammonia-selective catalytic reduction operation under specific operating conditions, including when a sufficient or predetermined amount of ammonia has been stored on the aftertreatment device 70. The active ammonia-selective catalytic reduction can be deactivated when the engine 10 is operating at low and medium load operating conditions including steady state operation with sufficient amount of stored ammonia. When the stored ammonia on the aftertreatment device 70 is substantially depleted, the active ammonia-selective catalytic reduction is used, with engine operation and urea injection controlled to achieve a stoichiometric urea/NOx ratio in the aftertreatment device 70. In event of a detected fault in the reductant injection device 55, including the ammonia reservoir tank 57 being empty, the engine 10 can be controlled to operate at or near stoichiometry in order to minimize NOx generation. The multi-stage catalytic converter 50 operates using the three-way catalytic function and oxygen storage/release to oxidize HC and CO and reduce NOx in the presence of stored oxygen.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An exhaust gas aftertreatment system for treating an engine-out exhaust gas feedstream of a spark-ignition direct-injection engine, comprising:
   a multi-stage catalytic converter comprising a converter inlet, a converter outlet, and a substrate having a first end associated with the converter inlet and a second end associated with the converter outlet, the substrate further comprising a multiplicity of flow passages between the first and second ends of the substrate, a first surface location corresponding to the first end of the substrate, and a second surface location corresponding to the second end of the substrate;

a first washcoat stage applied to the substrate at the first surface location corresponding to the first end of the substrate;

a second washcoat stage applied to the substrate at the second surface location corresponding to the second end of the substrate;

wherein the first and second washcoat stages comprising washcoats formulated to generate hydrogen and ammonia from the engine-out exhaust gas feedstream; and an ammonia-selective catalytic reduction device downstream of the first and second washcoat stages.

2. The exhaust gas aftertreatment system of claim 1, wherein the first washcoat stage is formulated to promote formation of ammonia when the exhaust gas feedstream is at stoichiometry and rich of stoichiometry and oxidize HC and CO when the exhaust gas feedstream is lean of stoichiometry, and the second washcoat stage is formulated to promote a water-gas shift reaction to reduce CO breakthrough and form ammonia using hydrogen produced during the water-gas shift reaction.

3. The exhaust gas aftertreatment system of claim 2, wherein the first washcoat stage includes platinum-group metals including palladium and excludes cerium.

4. The exhaust gas aftertreatment system of claim 2, wherein the second washcoat stage includes an alumina-based washcoat including palladium, rhodium, and cerium.

5. The exhaust gas aftertreatment system of claim 1, wherein the first washcoat stage is formulated to promote formation of ammonia when the exhaust gas feedstream is at stoichiometry and rich of stoichiometry and oxidize HC and CO when the exhaust gas feedstream is lean of stoichiometry, and the second washcoat stage is formulated to promote a water-gas shift reaction to reduce CO breakthrough and form ammonia using hydrogen produced during the water-gas shift reaction, oxidize HC and CO when the exhaust gas feedstream is lean of stoichiometry, and provide a three-way catalytic function when the exhaust gas feedstream is at stoichiometry.

6. The exhaust gas aftertreatment system of claim 1, wherein the first washcoat stage is formulated to promote water-gas shift reactions to form hydrogen molecules and initiate formation of ammonia when the exhaust gas feedstream is at stoichiometry and rich of stoichiometry and the second washcoat stage is formulated to promote ammonia formation and minimize ammonia oxidation.

7. The exhaust gas aftertreatment system of claim 6, wherein the first washcoat stage includes platinum-group metals including at least one of platinum and rhodium and including cerium.

8. The exhaust gas aftertreatment system of claim 6, wherein the second washcoat stage includes an alumina-based washcoat including at least one of platinum and palladium, and excluding cerium.

9. The exhaust gas aftertreatment system of claim 1, further comprising:

alternating ones of the multiplicity of flow passages plugged whereby the substrate further comprises a wall-flow filter device having a flow inlet side exposed to the exhaust gas feedstream prior to flowing through the porous walls of substrate and a flow outlet side exposed to the exhaust gas feedstream after flowing through the porous walls of substrate, wherein the first surface location further corresponds to the flow inlet side of the substrate, and the second surface location further corresponds to the flow outlet side of the substrate.

10. The exhaust gas aftertreatment system of claim 9, the substrate further comprising:

a third surface location corresponding to the second end and the flow inlet side of the substrate;

a fourth surface location corresponding to the first end and the flow outlet side of the substrate; and wherein the first washcoat stage is further applied to the substrate at the fourth surface location and the second washcoat stage is further applied to the substrate at the third surface location.

11. The exhaust gas aftertreatment system of claim 9, the substrate further comprising:

a third surface location corresponding to the second end and the flow inlet side of the substrate;

a fourth surface location corresponding to the first end and the flow outlet side of the substrate; and wherein the first washcoat stage is further applied to the substrate at the third surface location and the second washcoat stage is further applied to the substrate at the fourth surface location.

12. An exhaust gas aftertreatment system for treating an engine-out exhaust gas feedstream of a spark-ignition direct-injection engine, comprising:

a multi-stage catalytic converter comprising a converter inlet, a converter outlet, and a substrate having a first end associated with the converter inlet and a second end associated with the converter outlet, the substrate further comprising a multiplicity of flow passages between the first and second ends of the substrate, alternating ones of the multiplicity of flow passages plugged whereby the substrate further comprises a wall-flow filter device having a flow inlet side exposed to the exhaust gas feedstream prior to flowing through the porous walls of substrate and a flow outlet side exposed to the exhaust gas feedstream after flowing through the porous walls of substrate, a first surface location corresponding to the flow inlet side of the substrate, and a second surface location corresponding to the flow outlet side of the substrate;

a first washcoat stage applied to the substrate at the first surface location;

a second washcoat stage applied to the substrate at the second surface location;

wherein the first and second washcoat stages comprising washcoats formulated to generate hydrogen and ammonia from the engine-out exhaust gas feedstream; and an ammonia-selective catalytic reduction device downstream of the first and second washcoat stages.

13. The exhaust gas aftertreatment system of claim 12, wherein the first washcoat stage includes platinum-group metals including palladium and excludes cerium.

14. The exhaust gas aftertreatment system of claim 12, wherein the second washcoat stage includes an alumina-based washcoat including palladium, rhodium, and cerium.

15. The exhaust gas aftertreatment system of claim 12, wherein the first washcoat stage includes platinum-group metals including at least one of platinum and rhodium and including cerium.

16. The exhaust gas aftertreatment system of claim 12, wherein the second washcoat stage includes an alumina-based washcoat including at least one of platinum and palladium, and excluding cerium.

17. The exhaust gas aftertreatment system of claim 12, wherein the first surface location further corresponds to the second end of the substrate, and the second surface location further corresponds to the first end of the substrate.

18. An exhaust gas aftertreatment system for treating an engine-out exhaust gas feedstream of a spark-ignition direct-injection engine, comprising:
- a multi-stage catalytic converter comprising a converter inlet, a converter outlet, and a substrate having a first end associated with the converter inlet and a second end associated with the converter outlet, the substrate further comprising
    - a multiplicity of flow passages between the first and second ends of the substrate, alternating ones of the multiplicity of flow passages plugged whereby the substrate further comprises a wall-flow filter device having a flow inlet side exposed to the exhaust gas feedstream prior to flowing through the porous walls of substrate and a flow outlet side exposed to the exhaust gas feedstream after flowing through the porous walls of substrate,
    - a first surface location corresponding to the flow inlet side at the first end of the substrate,
    - a second surface location corresponding to the flow inlet side at the second end of the substrate, and
    - a third surface location corresponding to the flow outlet side of the substrate;
- a first washcoat stage applied to the substrate at the first surface location;
- a second washcoat stage applied to the substrate at the second surface location;
    - wherein the first and second washcoat stages comprising washcoats formulated to generate hydrogen and ammonia from the engine-out exhaust gas feedstream; and
- a third washcoat stage comprising an ammonia-selective catalytic reduction washcoat applied to the substrate at the third surface location.

19. The exhaust gas aftertreatment system of claim 18, wherein the first washcoat stage includes platinum-group metals including palladium and excludes cerium.

20. The exhaust gas aftertreatment system of claim 18, wherein the second washcoat stage includes an alumina-based washcoat including palladium, rhodium, and cerium.

21. The exhaust gas aftertreatment system of claim 18, wherein the first washcoat stage includes platinum-group metals including at least one of platinum and rhodium and including cerium.

22. The exhaust gas aftertreatment system of claim 18, wherein the second washcoat stage includes an alumina-based washcoat including at least one of platinum and palladium, and excluding cerium.

23. An exhaust aftertreatment system for treating an engine-out exhaust gas feedstream of a spark-ignition direct-injection engine, comprising:
- a multi-stage catalytic converter comprising a converter inlet, a converter outlet, and a substrate having a first end associated with the converter inlet and a second end associated with the converter outlet, the substrate further comprising
    - a multiplicity of flow passages between the first and second ends of the substrate, alternating ones of the multiplicity of flow passages plugged whereby the substrate further comprises a wall-flow filter device having a flow inlet side exposed to the exhaust gas feedstream prior to flowing through the porous walls of substrate and a flow outlet side exposed to the exhaust gas feedstream after flowing through the porous walls of substrate,
    - a first surface location corresponding to the flow inlet side at the first end of the substrate,
    - a second surface location corresponding to the flow inlet side at the second end of the substrate,
    - a third surface location corresponding to the flow outlet side at the second end of the substrate, and
    - a fourth surface location corresponding to the flow outlet side at the first end of the substrate;
- a first washcoat stage applied to the substrate at the first surface location;
- a second washcoat stage applied to the substrate at the fourth surface location;
- a third washcoat stage applied to the substrate at the second and third surface locations;
- the first and second washcoat stages comprising washcoats formulated to generate ammonia in the exhaust gas feedstream; and
- the third washcoat stage comprising an ammonia-selective catalytic reduction washcoat.

24. The exhaust aftertreatment system of claim 23, wherein the ammonia-selective catalytic reduction washcoat comprises a zeolite-based washcoat containing a base metal.

25. The exhaust aftertreatment system of claim 23, wherein the first washcoat stage includes platinum-group metals including palladium and excluding cerium to promote formation of ammonia when the exhaust gas feedstream is at stoichiometry and rich of stoichiometry and oxidize HC and CO when the exhaust gas feedstream is lean of stoichiometry.

26. The exhaust aftertreatment system of claim 23, wherein the second washcoat stage includes an alumina-based washcoat including palladium, rhodium, and cerium to promote a water-gas shift reaction to reduce CO breakthrough and form ammonia using hydrogen produced during the water-gas shift reaction.

* * * * *